United States Patent Office 2,725,951
Patented Dec. 6, 1955

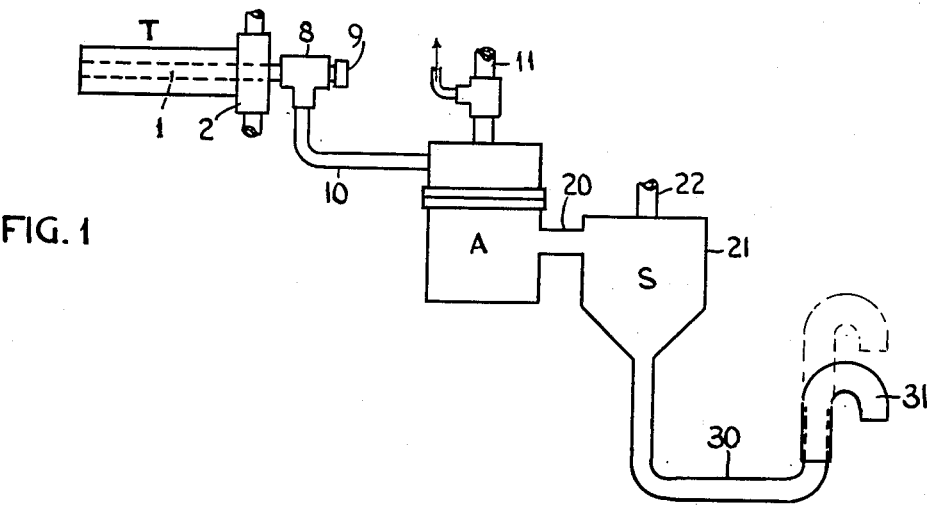
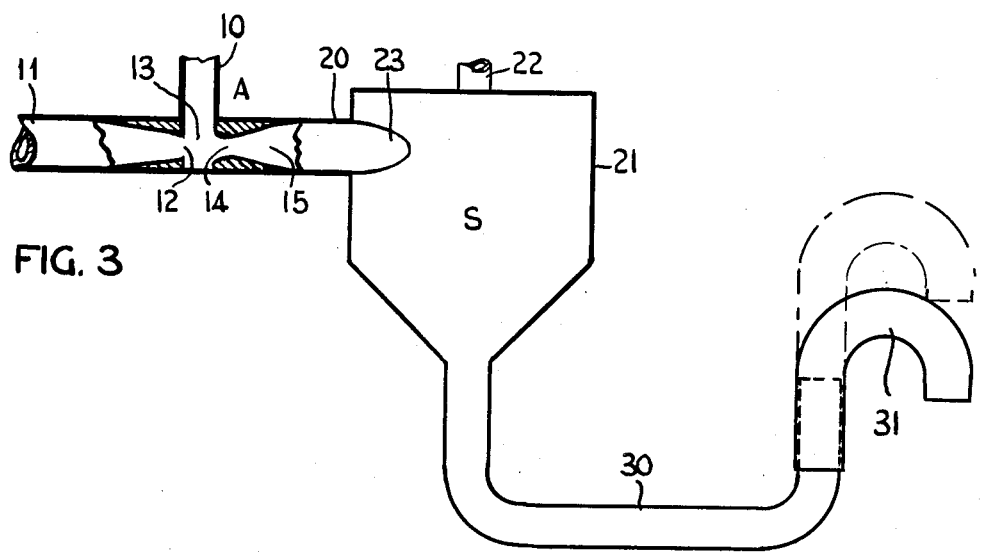
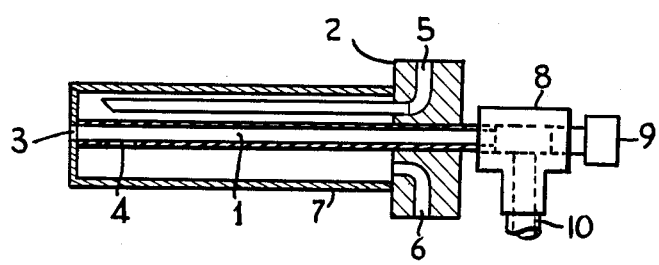

2,725,951

SAMPLING DEVICE

Eugene W. Geary, Zanesville, Ohio, assignor, by mesne assignments, to Columbia-Southern Chemical Corporation, Pittsburgh, Pa., a corporation of Delaware Application July 12, 1952, Serial No. 298,516

1 Claim. (Cl. 183—21)

This invention relates to gas sampling devices, and more particularly to means for purifying and feeding sample gas to a gas analyzer.

In the art it is usual to remove the gas to be analyzed from the flue or furnace by means of a small tube which is under vacuum. The sample gas usually carries with it much dust in the form of small particles, and usually the gas is composed of corrosive components. Most frequently the corrosive gases are sulfurous in nature. In the past, attempts have been made to remove both the corrosive gases and the dust by various means in order to prevent clogging of the tube and the other apparatus and to decrease corrosion. One such means is a series of baths and filters followed by separators to separate liquid and sample gas. This has proved unsatisfactory because of the necessity of continually maintaining the filter elements, which are subject to deterioration, and because the baths become highly acidic and corrosive, so that piping, pumps, and the gas analyzer itself were corroded and replacement was necessary. Another means used is a water aspirator in combination with filters and separators. This also has proved unsatisfactory and uneconomical because the lines became plugged with accumulated mud, and because the accumulating acids quickly corroded the parts. One defect common to all prior art devices is plugging of the sample tube itself with dust and mud, and none of the devices designed to avoid this has been satisfactory.

It is an object of this invention to provide means whereby a gas sample may be removed from a furnace with a minimum of trouble caused by accumulated sludge in the apparatus and with a minimum of corrosion.

It is a further object of this invention to provide an apparatus which is simple in design and which requires few mechanical parts, and which therefore requires little maintenance.

It is a still further object of this invention to provide an apparatus for obtaining gas samples whereby corrosion is minimized by completely and quickly removing from the gas sample all water-soluble corrosive gases.

It is another object of this invention to provide an apparatus for sampling gas from a furnace, which will be of low initial cost as well as of low upkeep, so that it will be inexpensive to buy as well as to use. The present sampling devices are complex and expensive, and it is the main object of this invention to provide simplified, inexpensive, gas samplers.

It is also an object of this invention to maintain the gas sampling tube in clean, clear and open condition, by a continual stream of fresh water washing the walls of said tube.

In the drawings,

Figure 1 is a schematic diagram of the entire gas sampling apparatus, incorporating the improved sampling tube and other improvements to the system as a whole.

Figure 2 is a cross-sectional view of the improved sampling tube.

Figure 3 is a schematic cross-sectional view of a modified form of the invention. The separator and its adjustable outlet are shown in series with a simplified representation of the aspirator.

My improved sampling apparatus is suitable for many kinds of gas analysis, but will be described as used in the analysis of furnace or kiln gases from a cement kiln. This type of gas is especially heavily contaminated with dust and with sulphurous and other corrosive component gases.

The apparatus shown in Figure 1 consists of a sample tube T, an aspirator A, and a separator S, connected in series. The tube T is adapted to be inserted in a furnace (connection not shown). Gas is withdrawn continuously through conduit 1, from which it passes through connecting tube 10 into aspirator A. The aspirator A discharges into separator S through discharge header 20. The separator S is preferably the conventional type with a cylindrical body portion 21, but any conventional type separator will suffice. Advantageously, with a cylindrical separator, discharge header 20 from the aspirator feeds into the separator tangentially, to secure turbulence and good separation.

The separator S discharges fluids received from the aspirator through the drain line 30. The gas sample, now free of dust and water-soluble corrosive components, escapes through an outlet 22 to the gas analyzer. If desired, for added protection of the analyzing equipment, a conventional felt filter, which is not shown, may be placed on the gas outlet line 22. In many cases this is superfluous because of the excellent cleansing job performed by my improved apparatus. The drain line 30 is provided with an adjustable trap, 31. The operator may adjust the pressure in the separator by raising and lowering the outlet on the trap 31. This provides convenient regulation for the pressure of the gas sample leaving through the gas outlet pipe 22 for the gas analyzer.

The aspirator A is described hereafter as a water aspirator, but it is obvious that any fluid aspirator would perform in much the same way. For instance, a steam ejector would be quite satisfactory if a suitable condenser were provided, but for reasons of economy, a water aspirator is preferred. In Figure 1, the water supply line to the aspirator is indicated at 11.

In Figure 1 there is shown a coupling 2 on the sampling tube T. This allows convenient attachment to a furnace or kiln. Any suitable attaching means may be used, however. Figure 2 shows the sampling tube T in detail. The sample gas is drawn into the sampling tube at the inlet aperture 3 by the pressure differential created by aspirator A. The inner tube or conduit 1 is surrounded by a concentric cylinder 7 which forms a water jacket. Fresh water is supplied to the jacket from a supply main under pressure by an inlet line 5, and water leaves the jacket by an exit line 6. The conduit has an aperture 4, which optionally may be a series of spaced apertures in a ring around the periphery of the conduit at the same distance from the gas inlet. Water from the jacket enters the conduit 1 through the aperture 4. The water is under a slight pressure because of the pressure differential created by the aspirator A, and the gas outlet, to some extent, because of its own hydrostatic pressure. Therefore, water entering the conduit 1 through the water inlet 4 washes back through the conduit and the connecting tube 10 to the aspirator.

The conduit is advantageously provided with a T 8 and a plug 9. This provides convenient access to the conduit 1 for occasional purging of the conduit and of line 10 with compressed air, water, etc. For added convenience valves may be inserted on each side of the T, but as they are not necessary, for simplicity they are not shown in the drawing.

The continuous washing of the conduit with water from the aperture 4 entrains much of the dust in the gas sample. The cooling action provided by circulation of the water in the water jacket has a dual purpose. First, it prevents the wash water injected through aperture 4 from overheating and vaporizing. Secondly, it regulates the gas temperature. It is obvious that the cooler the gas and water are kept, the less damage there will be to the apparatus by the corrosive components present. It is also possible to so regulate the cooling that the dew point of the gas sample is reached. If this is done there is a faster deposition and entrainment of dust in the wash water, since the condensation of moisture in the sample gas wets down the dust and carries it into the wash water. This combined cooling and washing action in the gas sample tube T is a special feature of my invention.

Referring now to Figure 3, wherein a modified form of the invention is shown, the gas and wash water feed into the aspirator A from line 10, and thence to the separator S. This figure shows the aspirator A in much simplified form, and is indicative of the extreme simplicity of design attainable through the use of my invention. As shown best in Figure 3, the aspirator A discharges through line 20 into the separator 5. The aspirator may be considered either as a vacuum pump or as a compressor. It creates a low pressure area in line 10 and conduit 1, and pumps its own fluid, the wash water from aperture 4, and the gas sample into the separator 5. Within the separator there is a relatively large volume, allowing the liquid and gas sample to separate. The liquid drains down to discharge drain line 30. An adjustable outlet 31 allows the pressure within the separator S to be regulated as desired. The gas sample escapes through the vent 22.

The use of the water aspirator A offers particular advantages. The fast-moving jet of water leaves the supply pipe 11 at the nozzle 12. The gas sample and any wash water are entrained in the throat area 13, and the mixture of high velocity water and entrained matter enters the venturi 14. As the water and entrained matter emerge from the constricted area their velocity decreases. The changes in velocity and pressure in the venturi discharge area 15 cause extreme turbulence, and as a result the water and gas sample are thoroughly mixed. Any remaining dust or fly ash is thoroughly wetted and removed from the gas during this period of agitation and turbulence. A further scrubbing action due to turbulence is obtained when tangential flow is used to feed into the cylindrical separator S, as shown in Figure 3 at 23.

It is to be particularly noted that my apparatus requires no filters or accessory pumps. Maintenance expense is therefore at a minimum. The water pressure for the cooling jacket on the tube T and for the aspirator A is supplied by the city main or other plant water service line. Dust is entrained in the wash water and in the aspirator water and is flushed out of the system. Corrosive gases which are water-soluble are completely eliminated by the combined action of the wash water and aspirator. Gases which are not water soluble have been found not to be damaging to the system. The action of the aspirator is particularly effective in dissolving soluble corrosive gases and in removing ash and dust.

Other advantages to my improved apparatus are obvious. The design is simple, easy to construct, and easy to repair. There are very few moving parts and these are simple parts. The continuous flushing of the conduit 1 and of the aspirator and separator by fresh water keeps the concentration of corrosive gases low, thereby decreasing the possibility of corrosion. Dirt, flue dust, and corrosive gases are flushed quickly from the system in such low concentration that there is no disposal problem for the acidic wash water. It may be drained into any common drain. In addition, the initial cost of my apparatus is low compared to others now available.

Having described my invention, what I claim is:

In a gas sampling device adapted for use in sampling gases containing corrosive components, an unobstructed sampling tube adapted to be positioned in a stream of hot gases and having a gas inlet and a gas outlet adjacent respective ends of said tube, a water jacket surrounding said sampling tube, means for supplying uncontaminated water to said water jacket to cool gas in said sampling tube and condense moisture vapor in said gas, said sampling tube being provided with an aperture adjacent the gas inlet, to permit the flow of water through said aperture from said jacket to flush said sampling tube, an aqueous ejector connected to said sampling tube outlet for exhausting gas and mud from said tube, said ejector having an effluent outlet, means for supplying uncontaminated water to said ejector, a separator operatively associated with said aqueous ejector for recovering solids- and mud-free gas from the effluent from said ejector, whereby the suction from said aqueous ejector is undiminished in said sampling tube adjacent the gas inlet thereof.

References Cited in the file of this patent

UNITED STATES PATENTS

| | | |
|---|---|---|
| 1,563,125 | Ward | Nov. 24, 1925 |
| 1,739,600 | Loth | Dec. 17, 1929 |
| 1,939,949 | Bertram | Dec. 19, 1933 |
| 2,011,224 | Kobiolke et al. | Aug. 13, 1935 |
| 2,053,200 | Miller et al. | Sept. 1, 1936 |
| 2,550,933 | McEvoy | May 1, 1951 |
| 2,604,185 | Johnstone et al. | July 22, 1952 |